United States Patent Office 2,913,487
Patented Nov. 17, 1959

2,913,487

PREPARATION OF VITAMIN A ACETATE

Davide R. Grassetti, Richmond, Calif., and Howard C. Klein, Brooklyn, N.Y., assignors to Nopco Chemical Company, Harrison, N.J., a corporation of New Jersey No Drawing. Application March 6, 1958
Serial No. 719,505

7 Claims. (Cl. 260—488)

The present invention relates to the preparation of a biologically active derivative of vitamin A, viz., vitamin A acetate.

Vitamin A, one of the growth producing vitamins, has been prepared in various ways both from natural sources and synthetically. However, vitamin A is oxidized readily by atmospheric oxygen, especially in the presence of light and heat. As a consequence, various anti-oxidants such as α-tocopherol, hydroquinone, etc., must be added and precautions taken in the preparation, and handling of this material. Furthermore, it is well known that under ordinary operating conditions, serious attrition of vitamin A results when it is brought in contact with acidic materials. For such reason, contact of vitamin A with acidic materials in the preparation of vitamin A derivatives is avoided wherever possible. It is known that esters of vitamin A are more stable than the free alcohol, vitamin A and in fact, the acetate ester is the basis of definition of the International and U.S.P. units of biological activity. Hence, it can be seen that vitamin A acetate is of great utility as a means for introducing a growth promoting substance into human and animal organisms.

It is an object of the present invention to provide for an improved process useful in the preparation of vitamin A acetate.

It is a more specific object to prepare vitamin A acetate in an improved manner from vitamin A aldehyde.

Other objects will become apparent from the detailed description herein. It is intended however, that the detailed description and specific example do not limit the invention, but merely indicate preferred embodiments thereof since various changes and modifications within the scope of the invention will become apparent to those skilled in the art.

Our process may be described as follows. A solution of vitamin A aldehyde is added to a suspension of lithium aluminum hydride at which time reaction between the aldehyde and hydride occurs to form a complex. Thereafter acetic anhydride is added to the complex in situ in its own reaction mixture and reacted therewith.

It is known how to convert vitamin A aldehyde to vitamin A by the procedure described by Wendler et al., J. Am. Chem. Soc. 72: 234 (1950). This procedure involves the interaction of vitamin A aldehyde with lithium aluminum hydride which produces a reaction complex. A subsequent hydrolysis step must be incorporated in order to liberate vitamin A by scission of the reaction complex, followed by isolation of the vitamin A by extraction with organic solvent, and careful evaporation of the solvent. It is also known how to acetylate vitamin A to produce vitamin A acetate, by the procedure described by Robeson et al., J. Am. Chem. Soc. 64: 2407 (1942). This procedure involves the treatment of vitamin A with an acetylating agent, acetyl chloride, under carefully controlled conditions. Thus, in order to minimize attrition of the vitamin, the acetylation is carried out in the presence of an organic solvent at relatively low temperature. Special care is taken to protect the reaction mixture from light. Moreover, employment of an organic base is specified in the acetylation process to tie up the hydrochloric acid which is liberated. This precaution is necessary since serious destruction of vitamin A would otherwise result due to the presence of hydrochloric acid. It was not obvious that acetic anhydride could be added directly to the reaction complex of vitamin A aldehyde and lithium aluminum hydride to obtain the acetate ester. By thus obtaining the acetate ester directly from vitamin A aldehyde, contact of vitamin A with acidic materials is avoided. Moreover, by obviating the need for the previously necessary steps of preparing and recovering vitamin A, opportunity for oxidation and loss of biologically active material is reduced to a considerable extent. Apart from the preceding advantages derived from the elimination of the heretofore necessary step of recovering vitamin A, other advantages accrue such as the elimination of the organic base required in the acetylation procedure of Robeson et al.

The following example represents a preferred embodiment of the present invention and is not to be construed in a limiting sense.

*Example*

0.200 gram of vitamin A aldehyde of 63.5% purity was dissolved in 20 ml. of dry ether and then added slowly at room temperature to a suspension of 0.100 gram of lithium aluminum hydride in diethyl ether. The mixture was kept at room temperature for ten minutes and then cooled in an ice bath. While cooling, a solution of 2 ml. of acetic anhydride dissolved in 20 ml. of diethyl ether was added slowly. The mixture was then refluxed under a nitrogen atmosphere for 25 minutes and subsequently poured into an aqueous solution of sodium bicarbonate. The product was extracted with diethyl ether and the ether solution dried over sodium sulfate. The ether was removed by distillation and 0.2165 gram of product was recovered. This represented a 94% (unpurified) yield. The product had a λ max=3260Å and $$E_{1\,cm}^{1\%} = 730$$

Saponification of the product and titration of the acetic acid liberated indicated that the product contained 53.5% vitamin A acetate. This represented a net yield of 80%.

If desired other complex metal hydrides besides lithium aluminum hydride may be used e.g., alkali metal borohydrides such as sodium borohydride, potassium borohydride and lithium borohydride. The amount of complex metal hydride present is at least ¼ mol of metal hydride per mol of vitamin A aldehyde. While far larger excesses may be employed on a laboratory scale without deleterious effect, from the point of view of safety and economy, smaller excesses i.e., quantities closer to that required by theory (¼ mol metal hydride per mol of vitamin A aldehyde) are preferred for plant scale runs. The duration of the reaction between the aldehyde and complex metal hydride is usually from 5 to 30 minutes and the reaction is preferably carried out at room temperature although temperatures of from 5° C. to 35° C. may be used.

The quantity of acetic anhydride present is at least 1 mol per mol of aldehyde. Preferably an excess is present. This reaction is generally carried out at the reflux temperature of the mixture (about 35° C.) although temperatures of from about 20° C. to reflux may be used. Heating is usually continued for 15 to 45 minutes. We have found it desirable to provide for an inert atmosphere for the reaction with acetic anhydride in order to minimize attrition of the reactants.

During reaction with the complex metal hydride as well as with acetic anhydride, a solvent which is inert to all of the reactants is present such as diethyl ether, tetrahydrofuran or di-n-butyl ether. The amount of solvent is not critical although sufficient quantities to form a dilute solution of the reactants are preferred.

Having described our invention what we claim as new and desire to secure by Letters Patent is:

1. A process for the preparation of vitamin A acetate from vitamin A aldehyde comprising reacting vitamin A aldehyde with a complex metal hydride, thereafter reacting the resulting reaction product which is a complex of said aldehyde and said hydride in situ in its reaction mixture with acetic anhydride and recovering the resulting vitamin A acetate.

2. The process of claim 1 in which said complex metal hydride is lithium aluminum hydride.

3. A process for the production of vitamin A acetate from vitamin A aldehyde comprising reacting in the presence of an inert solvent at least one quarter mol of a complex metal hydride per mol of vitamin A aldehyde, thereafter reacting the resulting reaction product which is a complex of said aldehyde and said hydride in situ in its reaction mixture with at least one mol of acetic anhydride per mol of vitamin A aldehyde and recovering the resulting vitamin A acetate.

4. The process of claim 3 in which said reaction with said complex metal hydride is carried out at a temperature of from about 5° C. to 35° C. and said reaction with acetic anhydride is carried out at a temperature of from about 20° C. to 35° C.

5. The process of claim 4 in which said complex metallic hydride is lithium aluminum hydride.

6. A process for the production of vitamin A acetate from vitamin A aldehyde comprising reacting in the presence of an inert solvent at least ¼ mol of lithium aluminum hydride per mol of vitamin A aldehyde at a temperature of from about 5° C. to 35° C. for about 1/12 to ½ hour, thereafter reacting the resulting reaction product which is a complex of said aldehyde and said hydride in situ in its reaction mixture with at least one mol of acetic anhydride per mol of vitamin A aldehyde at a temperature of from about 20° C. to 35° C. for about ¼ to ¾ hour and recovering said vitamin A acetate.

7. The process of claim 6 in which said aldehyde is reacted with said hydride at room temperature and said reaction product which is a complex of said aldehyde and said hydride is reacted with acetic anhydride at reflux temperature in an inert atmosphere.

References Cited in the file of this patent

UNITED STATES PATENTS 2,676,992    Humphlett _____ Apr. 27, 1954